UNITED STATES PATENT OFFICE.

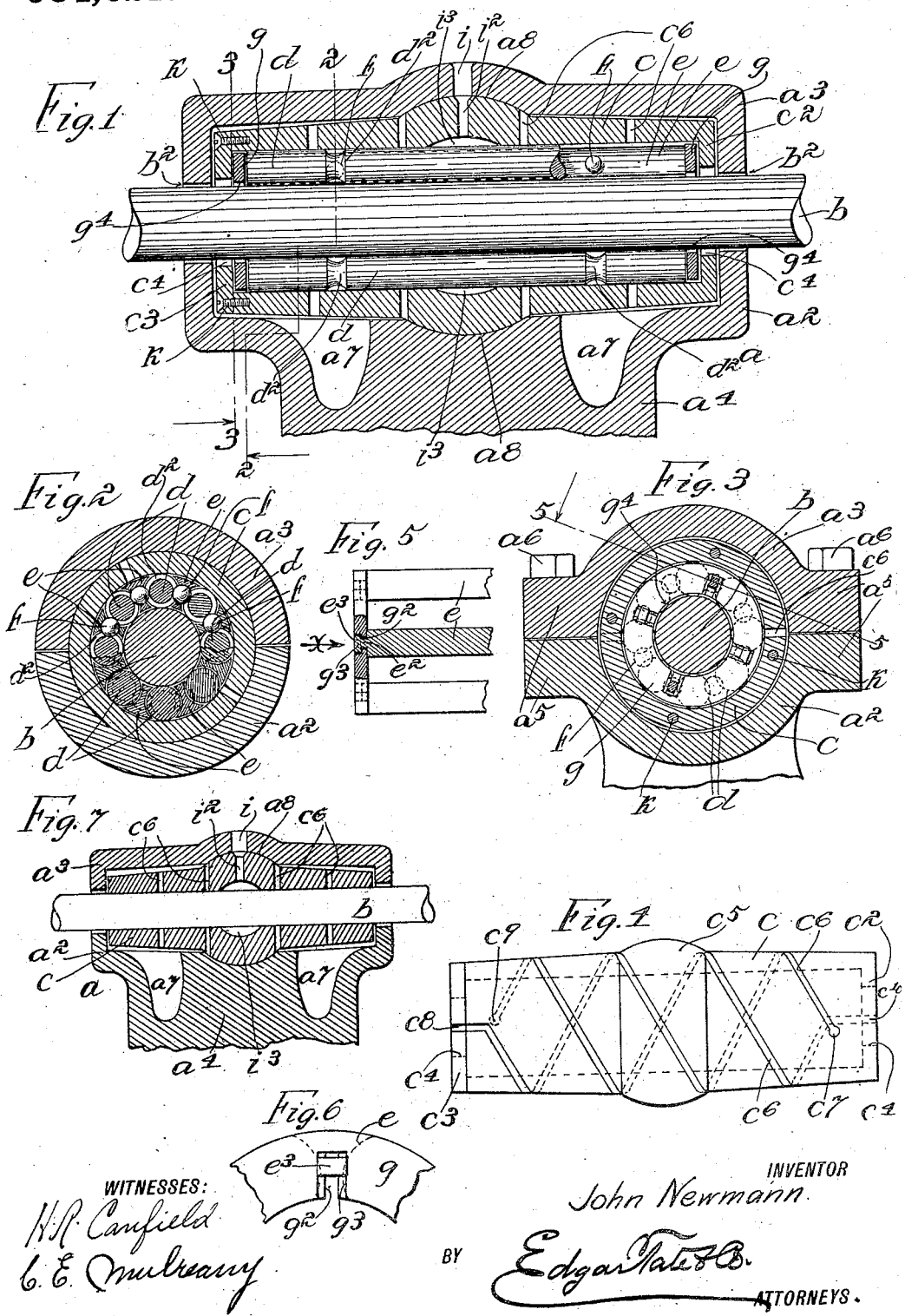

JOHN NEWMANN, OF BROOKLYN, NEW YORK.

ROLLER-BEARING.

934,621.

Specification of Letters Patent. Patented Sept. 21, 1909.

Application filed April 15, 1909. Serial No. 490,011.

*To all whom it may concern:*

Be it known that I, JOHN NEWMANN, a citizen of the United States, and residing at Brooklyn, in the county of Kings and State of New York, have invented certain new and useful Improvements in Roller-Bearings, of which the following is a specification, such as will enable those skilled in the art to which it appertains to make and use the same.

This invention relates to roller bearings for shafts; and the object thereof is to provide an improved bearing of this class which may be used wherever such bearings are required, such as a crank shaft bearing, journal box bearing, pedestal bearing and various other and similar relations.

The invention is fully disclosed in the following specification, of which the accompanying drawing forms a part, in which the separate parts of my improvement are designated by suitable reference characters in each of the views, and in which:—

Figure 1 is a sectional side view of a pedestal bearing showing my improvement, Fig. 2 a section on the line 2—2 of Fig. 1, Fig. 3 a section on the line 3—3 of Fig. 1, Fig. 4 a side view of an inner bearing sleeve which I employ, Fig. 5 a sectional side view of an inner detail of the construction shown in Figs. 1, 2 and 3, the section of said detail being on the line 5—5 of Fig. 3, Fig. 6 a partial end view of the construction shown in Fig. 5 looking in the direction of the arrow $x$, and;—Fig. 7 a view similar to Fig. 1 but showing a modification.

In the drawing forming part of this specification, I have shown at $a$ a pedestal bearing comprising a bottom box member $a^2$ and top box member $a^3$, the bottom box member $a^2$ being connected with and supported on a pedestal $a^4$, and the top box member $a^3$ and bottom box member $a^2$ are provided with side flanges $a^5$ and are adapted to be secured together by bolts or screws $a^6$ in the usual manner. I have also shown at $b$ a shaft which passes through the end portions of the box members $a^2$ and $a^3$, and the holes or apertures $b^2$ in the ends of said box members through which said shaft passes are of greater transverse dimensions than said shaft. The bottom of the box member $a^2$ is provided with oil chambers $a^7$ between which and centrally of said box member and of the pedestal $a^4$ is a transverse groove $a^8$, and a corresponding transverse groove $a^8$ is formed in the top of the top box member $a^3$, and said grooves taken together form an annular groove in the complete housing formed by the parts $a^2$ and $a^3$, which is arc-shaped in cross section. I also provide a sleeve bearing $c$ having a central longitudinal bore and one end of which is provided with an inwardly directed annular rim or flange member $c^2$ which partially closes said end of said sleeve bearing, and the other end of which is provided with an annular plate $c^3$ which corresponds with the annular rim or flange member $c^2$, and the shaft $b$ passes centrally through the sleeve bearing $c$, and the end openings $c^4$ in the rim or flange $c^2$ and annular plate $c^3$ are also of much greater transverse dimensions than the shaft $b$.

The central portion of the sleeve bearing $c$ is formed to correspond with and fit the annular concave space formed by the grooves $a^8$, said central portion being convex or arc-shaped in cross section longitudinally of the sleeve bearing $c$, and the end portions of said central part are tapered as clearly shown in Fig. 1, said end portions of said sleeve bearing being of less transverse dimensions than the chamber in the housing formed by the parts $a^2$ and $a^3$, and with this construction, as will be seen, the end portions of the sleeve bearing $c$ are capable of slight lateral and vertical movement, or may be oscillated to a slight extent in any direction.

The interior or central bore of the sleeve bearing $c$ is of much greater diameter or transverse dimensions than the shaft $b$, and placed therein are longitudinal anti-friction bearing rollers $d$ between which are placed longitudinal bars $e$ the opposite side portions of which are concave in cross section and adapted to receive the rollers $d$, and placed in the bars $e$ are balls $f$ said balls, in the construction shown, being arranged in a circle around the central portion of the bearing and on the opposite sides of the middle thereof. The balls $f$ project from the sides of the bars $e$, and the rollers $d$ are provided with grooves $d^2$ in which said balls fit and are free to turn, and said balls are also free to turn in the bars $e$.

In the construction shown, there are eight of the bars $e$ and eight of the rollers $d$ and four of the bars $e$ are connected at their ends by annular plates $g$ so as to form a box work construction, and this connection of the said bars $e$ with the plates $g$ is made as shown in Figs. 5 and 6. The said plates $g$ are provided in their inner edges with radial recesses $g^2$, the outer portions of which are enlarged as shown at $g^3$ and the bars $e$ that are secured to the plates $g$ are provided with projections $e^2$ which enter the recesses $g^2$ and are provided with heads $e^3$ which fit in the enlarged portions $g^3$ of the radial recesses $g^2$ all as clearly shown in Figs. 5 and 6. With this construction the bars $e$ may be detached from the end plates $g$ at any time by simply moving said bars inwardly.

The end plate $c^3$ is secured to the bearing sleeve $c$ by screws $k$, and this construction forms of the bearing sleeve a box in which the rollers $d$, the bars $e$ and the balls $f$ fit, and said rollers $d$, bars $e$ and the annular plates $g$ also form a box within the sleeve $c$ of which the rollers $d$ only bear on the shaft $b$, and it will be observed that the transverse dimensions of the annular plates $g$ are of less dimensions than the corresponding dimensions of the end portions of the sleeve $c$, and the apertures $g^4$ in the plates $g$ through which the shaft $b$ passes are of greater transverse dimensions than said shaft.

The sleeve $c$ is provided centrally with an annular convex portion $c^5$ which corresponds with the inner concave portion $a^3$ of the box or housing formed by the parts $a^2$ and $a^3$ and which fits therein, and said sleeve is provided with spiral slots $c^6$ two of which are shown and one of which begins adjacent to one end thereof as shown at $c^7$ and extends outwardly through the opposite end as shown at $c^8$, and the other of which begins adjacent to the opposite end of said sleeve as shown at $c^9$ and extends outwardly through the opposite end as indicated at $c^{10}$, and this gives to said sleeve a radially elastic character, the extent of the elasticity depending upon the material employed in the construction of said sleeve and the thickness thereof.

Formed in the central part of the top portion $a^3$ of the box or housing $a$ is a radial aperture $i$, and the central portion of the sleeve $c$ is provided with a corresponding aperture $i^2$, and the central portion of the sleeve $c$ is also provided with a central annular groove $i^3$, and in order to lubricate the bearing, oil or other lubricant material is poured in through the apertures $i$ and $i^2$ into the groove $i^3$ and is free to circulate around and between the rollers $d$ and bars $e$ and in the annular grooves $d^2$ in the rollers $d$ and this oil or lubricant material also passes through the slots $c^6$ in the sleeve $c$ and into the chambers $a^7$, and this oil may practically fill the bottom portion of the housing $a$ and may rise therein so as to flow inwardly through the central openings $c^4$ in the ends of the sleeve $c$, or the parts $c^2$ and $c^4$ thereof as will be readily understood and in this way the entire bearing or all the parts thereof may be kept thoroughly lubricated at all times.

When the parts of this bearing are assembled in the manner shown and described, the rollers $d$ bear on the shaft $b$ and said rollers are free to turn and this construction forms a perfect roller bearing, and the said rollers together with the bars $e$ and the annular end plates $g$ which are secured to a portion of the bars $e$ as hereinbefore described form a box bearing which is also free to turn in the sleeve $c$, and of this box bearing only the rollers $d$ come in contact with or bear on the inner walls of the sleeve $c$.

The normal inner diameter of the sleeve $c$ is preferably slightly less than the greatest diameter of the box roller bearing of which the rollers $d$ form a part, and by reason of this construction the said box roller bearing has to be forced into position and the rollers $d$ therein are firmly pressed upon the shaft $b$ and the elastic quality of the sleeve $c$ is such that pressure will be exerted on the rollers $d$ at all times, and this pressure will serve to take up a considerable amount of wear.

In Fig. 7 I have shown a modification in which only the sleeve $c$ is employed in the housing $a$, the rollers $d$, bars $e$, balls $f$ and annular end plates $g$ being omitted, and in this form of construction the central bore of the sleeve $c$ fits the shaft $b$ throughout, but the said sleeve and shaft are capable of slight oscillation in all directions the same as with the construction shown in Fig. 1, and this, as will be seen, provides means whereby any vibration of the shaft $b$ is accommodated in the operation of said shaft.

Having fully described my invention, what I claim as new and desire to secure by Letters Patent, is:—

1. In a shaft bearing of the class described, a housing composed of top and bottom members and a sleeve mounted therein, said housing being provided centrally and transversely thereof with an annular groove which is arc-shaped in cross section, and said sleeve being provided centrally thereof with an enlarged annular portion which fits in said groove, the end portions of said sleeve being tapered whereby said sleeve is capable of oscillatory or vibratory movement, and said sleeve being provided with spiral slots which begin adjacent to the opposite ends thereof and which open outwardly through the other ends thereof.

2. In a shaft bearing of the class described, a housing composed of top and bottom members and a sleeve mounted therein, said housing being provided centrally and transversely thereof with an annular groove which is arc-shaped in cross section, and said sleeve being provided centrally thereof with an enlarged annular portion which fits in said groove, the end portions of said sleeve being tapered whereby said sleeve is capable of oscillatory or vibratory movement, and said sleeve being provided with spiral slots which begin adjacent to the opposite ends thereof and which open outwardly through the other ends thereof, and a box bearing placed within said sleeve and composed of parallel bars, intermediate rollers placed between said bars and end plates, the opposite sides of said bars being convex in cross section and adapted to receive said rollers, and balls placed in said bars and movable therein and in annular grooves formed in said rollers.

3. In a bearing of the class described, a housing composed of top and bottom members and provided centrally with an internal annular groove which is arc-shaped in cross section, a sleeve adapted to fit in said housing and the end portions of which are tapered and the central portion of which is annularly enlarged and adapted to fit in said annular groove whereby said sleeve is capable of oscillation in different directions, a shaft passed through said housing and through said sleeve, and an inner box bearing placed in said sleeve and composed of parallel bars, intermediate rollers and end plates connected with said bars or a part thereof, the side portions of said bars being concave in cross section and adapted to receive said rollers, and balls placed in said bars and adapted to fit in grooves formed in said rollers, said sleeve being also provided with end members which hold said box bearing in place, and the end openings in said housing being of greater transverse dimensions than said shaft.

4. In a shaft bearing of the class described, a housing and a sleeve mounted therein, said housing being provided centrally and transversely thereof with an annular groove which is arc-shaped in cross section, and said sleeve being provided centrally thereof with an annular enlargement which fits in said groove, the end portions of said sleeve being tapered whereby said sleeve is capable of oscillatory or vibratory movement in the housing, the ends of the housing being provided with openings through which the shaft is passed, and said openings being of greater transverse dimensions than said shaft, and the end portions of said sleeve being radially elastic.

5. In a shaft bearing of the class described, a sleeve the end portions of which are tapered, said sleeve being provided with spirally arranged slots which begin adjacent to the opposite ends thereof and one of which opens through one end thereof and the other through the other end thereof.

6. In a shaft bearing of the class described, a housing composed of top and bottom members, and a sleeve mounted therein and through which the shaft passes, said sleeve being provided with spirally arranged slots which extend in opposite directions and one of which opens through one end thereof and the other through the opposite end.

7. In a shaft bearing of the class described, a housing, a sleeve placed therein and through which the shaft passes, said sleeve being provided with spirally arranged slots which extend in opposite directions and one of which opens through one end and the other through the opposite end thereof, and a box roller bearing placed between said sleeve and said shaft.

8. In a device of the class described, a box bearing composed of parallel bars connected by annular end plates, intermediate rollers placed between said bars, the side portions of said bars being concave in cross section and adapted to receive said rollers, and said rollers being provided with annular grooves, and balls placed in said bars and adapted to fit in said annular grooves.

9. In a shaft bearing of the class described, a housing composed of top and bottom members and a sleeve mounted therein, said housing being provided centrally and transversely thereof with an annular groove which is arc-shaped in cross section, and said sleeve being provided centrally thereof with an enlarged annular portion which fits in said groove, the end portions of said sleeve being tapered whereby said sleeve is capable of oscillatory or vibratory movement, and said end portions of said sleeve being radially elastic.

In testimony that I claim the foregoing as my invention I have signed my name in presence of the subscribing witnesses this 13th day of April 1909.

JOHN NEWMANN.

Witnesses:
H. R. CANFIELD,
C. E. MULREANY.